US012048939B1

(12) United States Patent
Rojas

(10) Patent No.: US 12,048,939 B1
(45) Date of Patent: Jul. 30, 2024

(54) SHIELD DEVICE FOR PAINTING, INCLUDING A MAGNETICALLY ATTACHABLE OPENING

(71) Applicant: Antonio Rojas, Orlando, FL (US)

(72) Inventor: Antonio Rojas, Orlando, FL (US)

(*) Notice: Subject to any disclaimer, the term of this patent is extended or adjusted under 35 U.S.C. 154(b) by 0 days.

(21) Appl. No.: 17/883,207

(22) Filed: Aug. 8, 2022

Related U.S. Application Data

(60) Provisional application No. 63/230,999, filed on Aug. 9, 2021.

(51) Int. Cl.
*B05B 12/24* (2018.01)
*B05C 21/00* (2006.01)

(52) U.S. Cl.
CPC ............ *B05B 12/24* (2018.02); *B05C 21/005* (2013.01)

(58) Field of Classification Search
None
See application file for complete search history.

(56) References Cited

U.S. PATENT DOCUMENTS 2,721,597 A * 10/1955 Pitrella ................. E05B 1/0061 16/DIG. 30
2,728,323 A * 12/1955 Walton .................... B05B 12/20 428/31
2,925,064 A 2/1960 Kahn
3,722,470 A 3/1973 Farrell
4,327,663 A * 5/1982 Izzo ........................ B05B 12/20 15/257.01
4,656,058 A * 4/1987 Stark ........................ B05D 1/32 118/504
4,695,486 A 9/1987 Stark
4,747,366 A * 5/1988 Walker .................... B05B 12/20 427/300
5,003,128 A * 3/1991 Grondin .................. B05B 12/20 174/67
5,008,551 A 4/1991 Randolph
5,063,872 A 11/1991 Maus et al.
5,432,979 A 7/1995 Harper
5,829,622 A * 11/1998 Neuman .................. H02B 1/14 220/818
5,840,122 A 11/1998 Williams
6,103,974 A 8/2000 Erdfarb
6,165,269 A 12/2000 Kathe
7,022,915 B1 4/2006 Galguera
7,077,909 B1 7/2006 Crane
7,105,057 B1 9/2006 Colussi et al.
9,061,305 B1 * 6/2015 Martinez ................ B05B 12/20
(Continued)

*Primary Examiner* — Jethro M. Pence
(74) *Attorney, Agent, or Firm* — John Rizvi; John Rizvi, P.A—The Patent Professor

(57) ABSTRACT

A shield device may be secured, without the use of tape, to objects protruding from a surface to be painted in order to mask the objects. One or more magnets are secured around an opening of the shield device for securing to one another or the object. The shield device may also be used to cover parts of vehicles, machines, or other structures for enhancing safety. The shield device may be made of one or more panels of paint-impermeable material define an opening and an interior space extending from the opening toward a distal end of the one or more panels. A slit may extend from the opening partially toward the distal end. The magnets may be spaced apart from one another by a first distance with a second distance between magnets and sides of the slit being smaller.

16 Claims, 5 Drawing Sheets

(56) References Cited

U.S. PATENT DOCUMENTS

| | | | | |
|---|---|---|---|---|
| 9,352,349 | B2 * | 5/2016 | Mikesell, Sr. | B05C 21/005 |
| 10,035,171 | B2 * | 7/2018 | Boukair | B05C 17/0222 |
| 11,400,475 | B1 * | 8/2022 | Spigener | F04D 29/703 |
| 11,571,707 | B1 * | 2/2023 | Oniszczuk | B05B 12/20 |

* cited by examiner

SHIELD DEVICE FOR PAINTING, INCLUDING A MAGNETICALLY ATTACHABLE OPENING

CROSS-REFERENCE TO RELATED APPLICATIONS

This application claims the benefit of U.S. Provisional Patent Application No. 63/230,999, filed on Aug. 9, 2021, which is incorporated by reference herein in its entirety.

FIELD OF THE INVENTION

The present invention relates generally to coverings for applying to objects while surrounding areas are being painted, and more particularly, to coverings for doorknobs or other protruding objects.

BACKGROUND OF THE INVENTION

Painting objects such as walls, furniture, vehicles, and the like requires skill. In a first step of the process, surfaces to be painted may be prepared. Preparation may include sanding, washing, or other steps to prepare surfaces to be painted to receive paint without bubbling or peeling. Objects and surfaces that are not to be painted may also be masked as part of preparation.

Some objects to be masked are secured to the surface to be painted, such as doorknobs, light fixtures, ceiling fans, and the like. Other objects, such as appliances, are adjacent the area to be painted and not movable. Still other objects, such as tables, pianos, and other furniture, are freestanding objects that may also need to be protected.

The surface to be painted may be part of a building, such as a wall or ceiling, and the objects to be masked may be affixed to the wall or resting on the floor of the building. In other instances, the surface to be painted is part of a vehicle or machine and the object to be shielded is a different part of the vehicle or machine.

Some objects are small enough that they may be covered with masking tape. Other objects may be covered by sheets of plastic or other material that is secured with masking tape. Following masking of objects that are not to be painted, the surfaces to be painted may be painted with one or more coats of paint. While the paint is still malleable, the masking tape or plastic may then be carefully removed in order to avoid pulling the paint off the painted surfaces.

In many painting projects, the masking process is more time consuming and more difficult to perform correctly than the painting itself. It would be an advancement in the art to provide an improved approach for performing masking in preparation for painting.

SUMMARY OF THE INVENTION

The present invention is directed to a shield device that may be secured to objects protruding from a surface to be painted, or to other objects, items or structures, without the use of tape. The shield device includes a shield body comprising an interior space and an opening providing access to the interior space. The shield body may be easily and rapidly deployed over, and optionally onto, the surface or structure to be protected or masked. One or more magnetic fasteners may magnetically attach the shield body to the surface or structure. Alternatively or additionally, one or more magnets carried by the shield body may attach to one another to adjust the size of the opening, and thereby secure the shield body to the structure.

In one aspect of the invention, one or more panels of paint-impermeable material define an opening and an interior space extending from the opening toward a distal end of the one or more panels, the interior space sized to receive an object. A plurality of magnets may be distributed around the opening and each adjacent the opening.

In a second aspect, a slit may extend from the opening partially toward the distal end. Magnets may be spaced apart from one another by a first distance with a spacing between the magnets adjacent the slit and the slit being a second distance that is less than 0.5 times, less than 0.25 times, or less than 0.125 times the first distance.

In a third aspect, the shield device may be used by inserting an object into the interior space and engaging the magnets with a base of the object, the object protruding from a surface to be painted. The surface may be painted followed by removal of the shield device.

In a fourth aspect, the shield device may be placed over an object and the magnets engaged with one another to secure the shield device around the object.

In a fifth aspect, the shield device includes colors, markings, or text to enable the shield device to direct actions of people interacting with an object covered by the shield device.

In a sixth aspect, the shield device is used to reduce spread of disease by covering objects that would otherwise be contacted by people.

In an implementation of the invention, a shield device may include a paint-impermeable, shield body. The shield body may include an interior space, and an opening providing access to the interior space for the insertion and removal of one or more objects into and from the interior space. The shield device may further include at least one magnet arranged along at least part of the perimeter of the opening and adjacent to the opening. The at least one magnet may be configured to secure the shield body to an object positioned within the opening.

In another aspect, the shield body may be permanently formed into a bag-like structure. Access to the interior space of the bag-like structure may be provided solely through the opening.

In another aspect, the shield device may further include at least one slit extending into and partially along the shield body from the opening.

In another aspect, the shield device may further include one or more magnets extending along the at least one slit and configured to magnetically attach to the object.

In yet another aspect, the shield device may further include one or more magnets extending along the at least one slit and configured to magnetically attach to one another to close the slit.

In another aspect, the at least one magnet may include a plurality of magnets arranged in discrete positions along the perimeter of the opening.

In another aspect, the magnets may be arranged in spaced-apart relationship with one another.

In another aspect, one or more magnets of the plurality of magnets may be configured to magnetically attach to one another to adjust the size of the opening.

In yet another aspect, the plurality of magnets may be configured to attach to a ferromagnetic material of the object positioned within the opening.

In another aspect, the at least one magnet may include at least one elongated magnet elongately formed along at least part of the perimeter of the opening.

In another aspect, the at least one magnet may include an elongated magnet elongately formed along about the entire perimeter of the opening.

In another aspect, the shield body may be deformable.

In yet another aspect, the shield device may further include at least one slit extending into and partially along the shield body from the opening. The size of the at least one slit may be adjusted by deforming the shield body.

In another aspect, the shield body may be made of two or more panels of paint-impermeable material. The two or more panels may be secured to one another along one or more seams forming a bag-like structure.

In another aspect, the shield body may be made of a single panel of paint-impermeable material. The single panel may be arranged folded onto itself and secured along a seam forming a bag-like structure.

In another aspect, an end portion of the shield body may be arranged in a folded-over configuration along the perimeter of the opening and secured in the folded-over configuration defining a sleeve. The at least one magnet may be positioned inside the sleeve.

In another aspect, the shield body may include an end portion defining the perimeter of the opening. The end portion may be sized to conform to the object positioned within the opening. For example, the end portion may be sized such that the end portion may conform to a rose of a doorknob.

In yet another aspect, the at least one magnet may be configured to secure the end portion against the object (e.g., doorknob rose) positioned within the opening along the entire perimeter of the opening.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention is directed toward a shield device for covering protruding structures that are secured to a surface to be painted. Shown throughout the figures are illustrative embodiments of the invention, which include magnets distributed about an opening enabling the shield device to be easily placed and removed, particularly on ferromagnetic protruding structures.

Figure 1:
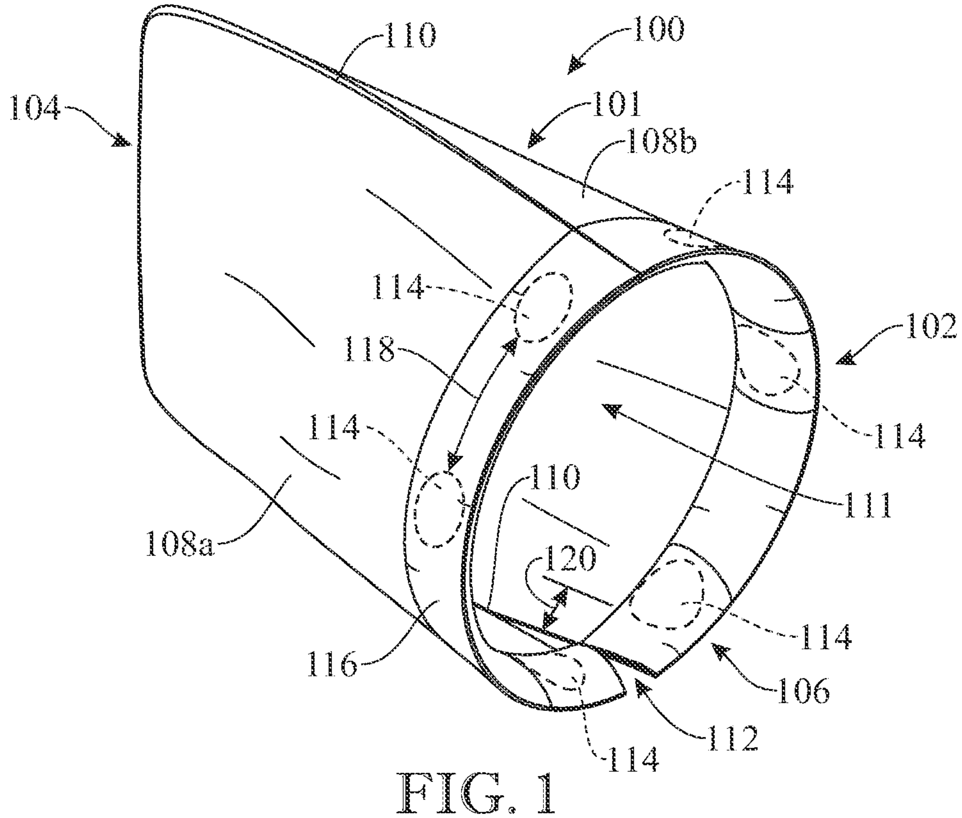
FIG. 1 presents an upper isometric view of a shield device in accordance with an embodiment of the present invention.
Figure 2:
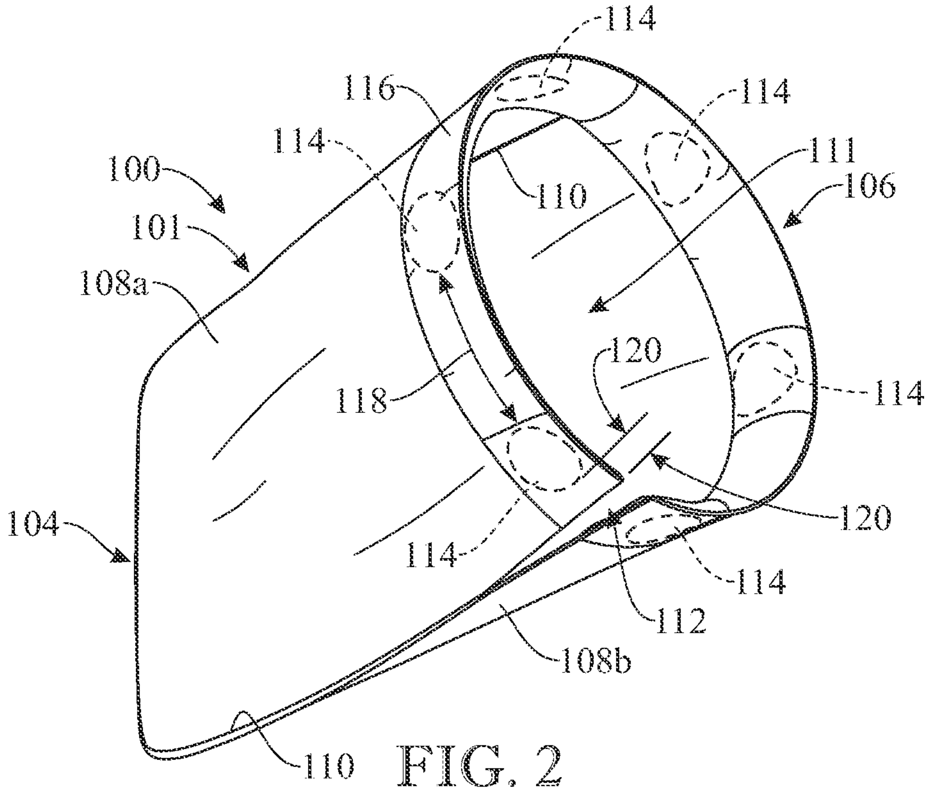
FIG. 2 presents a lower isometric view of the shield device of FIG. 1.

Referring initially to FIGS. 1 and 2, a shield device 100 is shown comprising a shield body 101, including a proximal end 102 and a distal end 104 opposite the proximal end 102. The shield body 101 is configured to cover or mask an object, surface, or other structure. During use, the shield body 101 of the shield device 100 may be positioned such that the proximal end 102 is closer to a surface to be painted. The shield body 101 of the shield device 100 may be constructed generally in a bag or pocket form, as shown, and define an opening 106 at the proximal end 102 for receiving a protruding object secured to a surface to be painted. In use of the shield device 100, the protruding object may extend through the opening 106 and into the bag- or pocket-like, shield body 101 of the shield device 100 toward the distal end 104 of the shield device 100, such that the protruding object is received within the shield body 101. As shown, the distal end 104 and sidewalls of the shield body 101 may be generally closed, i.e. devoid of openings.

In the illustrated embodiment, the shield body 101 of the shield device 100 includes two sidewall portions or panels 108*a*, 108*b* extending from the opening 106 toward the distal end 104. The two panels 108*a*, 108*b* may be secured to one another at a seam 110. In the illustrated embodiment, the seam 110 extends from a first point adjacent the opening 106, around the shield device 100 to the distal end 104, and back to a second point adjacent the opening 106. In other embodiments, the shield device 100 may be made of a single sheet, sidewall portion or panel of material secured to itself by a seam 110 extending from adjacent the opening 106 to the distal end but not extending back to another point adjacent the opening 106. As used herein "adjacent" may be understood to be "within 5 mm of."

The panels 108*a*, 108*b* may be formed of a flexible and paint-impermeable material and define an interior space 111 extending from the opening 106 toward the distal end 104 of the shield body 101. In some embodiments, the panels 108*a*, 108*b* may be made of synthetic (nylon, polyester, etc.) or natural (cotton, linen, etc.) fibers configured to be sufficiently impermeable to paint to function as a shield device. In some embodiments, the panels 108*a*, 108*b* may be a continuous sheet of a polymer such as nylon, polyurethane, polystyrene, cellophane, silicone, natural or synthetic rubber, or other polymer. The seam 110 may be formed by stitches, adhesive, welding, rivets, or other fastening means.

In the illustrated embodiment, the shield body 101 defines a slit 112 extending along a part of the length of the seam 110 from the proximal end 102 toward the distal end 104. For example, the slit 112 may extend from 0.5 to 4 cm, such as from 1 to 3 cm, from the opening 106 toward the distal end 104. In other embodiments, the slit 112 extends from the opening 106 toward the distal end 104 by between 0.01 to 0.1 times the perimeter length of the opening 106. The perimeter length may be defined as the length of the perimeter of the opening 106 measured from one side of the slit 112 to the other side of the slit 112.

A plurality of magnets 114 may be secured to the shield device 100 around the opening 106, such as from 0 to 5 mm from the opening 106. The plurality of magnets 114 jointly provide an elongated magnetic fastener extending along part of, and preferably generally all, the perimeter length of the opening 106. The magnets 114 depicted herein are shown as discrete cylindrical magnets. The cylindrical magnets may have a diameter of from 3 to 15 mm and a thickness of from 1 to 5 mm. The cylindrical magnets may be magnetized iron, nickel, cobalt, or rare earth minerals. In some embodiments, the elongated magnetic fastener may be provided by a flexible magnetic material arranged extending from one side of the slit 112 to the other side of the slit 112 in one, two, or other number of pieces. Other shapes and types of magnets may also be used.

In the illustrated embodiment, the magnets 114 are secured to the shield device 100 by folding portions 116 of the panels 108*a*, 108*b* over the magnets 114 and securing the portions 116 to the panels 108*a*, 108*b* by means of stitching, adhesives, welding, rivets, or other fastening means. The magnets 114 may be free to slide within the sleeve formed by the folded portions 116 or may be secured within pockets within the sleeve by securing the portions 116 to the panels 108*a*, 108*b* on either side of each magnet 114. In other embodiments, the magnets 114 are secured to the shield device 100 by bonding the magnets 114 to the panels 108*a*, 108*b* around the opening by means of adhesives either with or without the use of the folded portions 116. Other fastening means may also be used.

In the illustrated embodiment, the magnets 114 are distributed around the opening 106 and separated by a length 118 of material of the panels 108*a*, 108*b*. The length 118 between all pairs of contiguous magnets 114 may be substantially (e.g., within 3 mm) equal or non-equal. The average length 118 for all pairs of contiguous magnets 114 may be from 0.05 to 0.25 times the perimeter length of the perimeter of the opening 106. The separation 120 between the magnets 114 closest to the sides of the slit 112 and the sides of the slit 112 may be less than the length 118, such as less than 0.5 times, less than 0.25 times, or less than 0.125 times the length 118. In some embodiments, the separation 120 is less than 3 mm.

Figure 3:
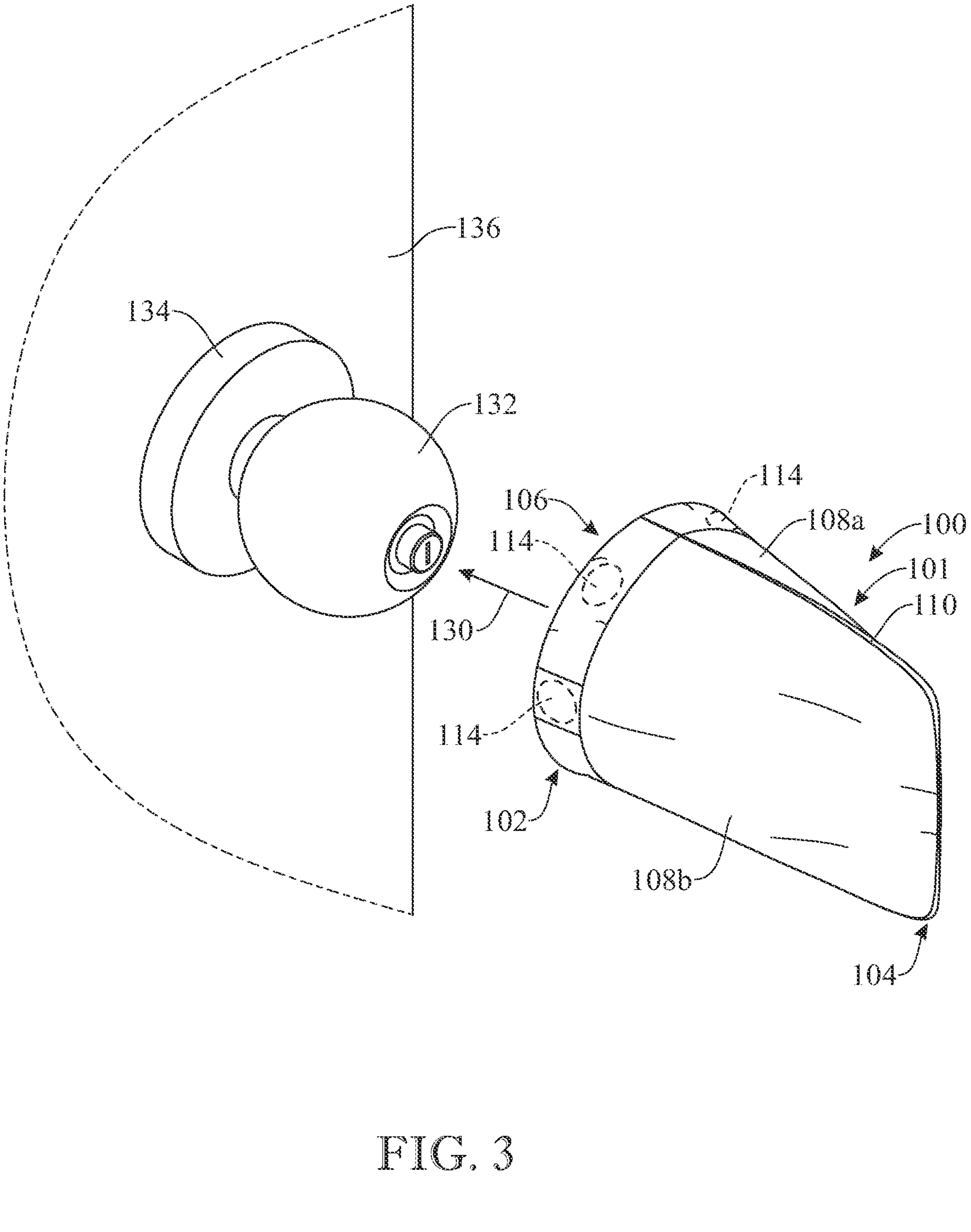
FIG. 3 presents the shield device of FIG. 1 being applied to a doorknob in accordance with an embodiment of the present invention.
Figure 4:
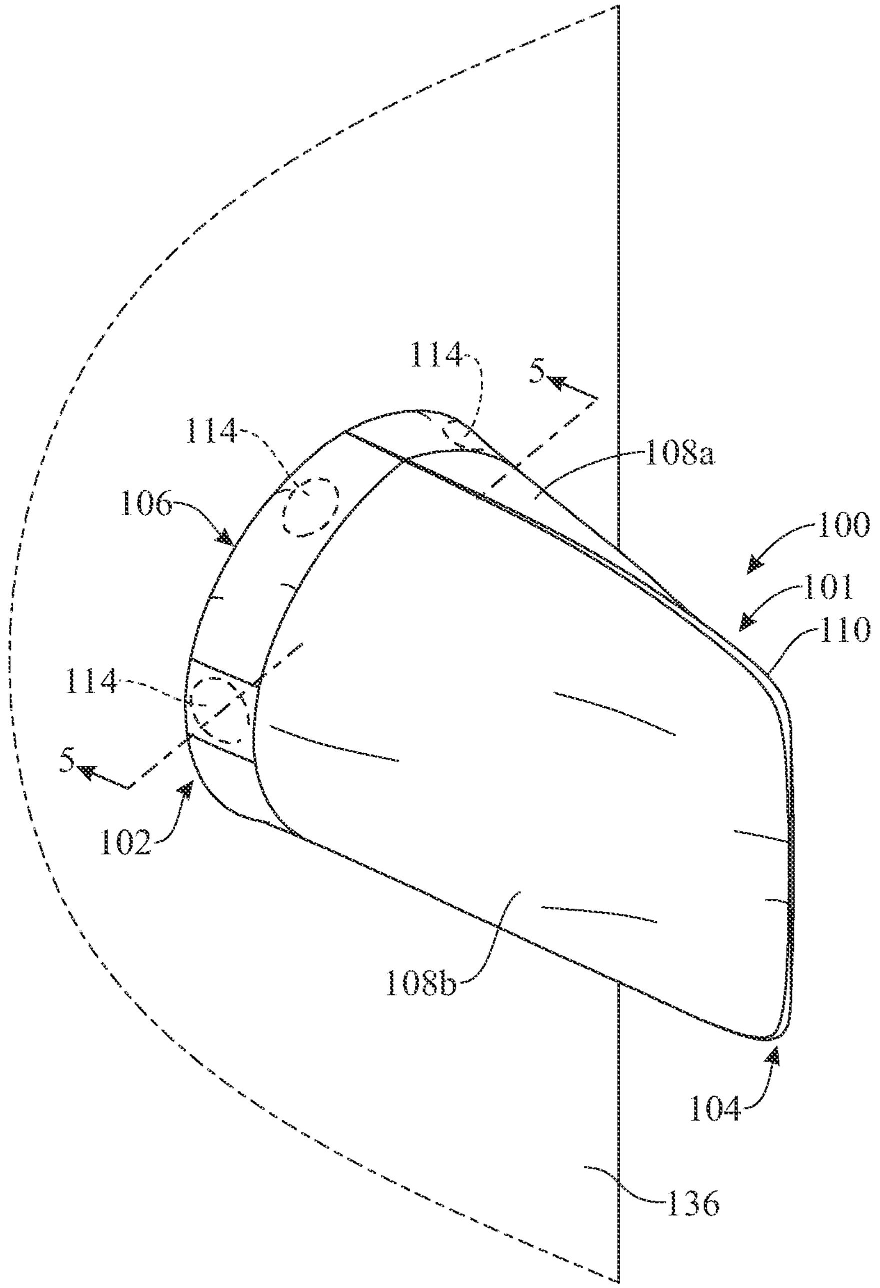
FIG. 4 presents the shield device of FIG. 1 secured over the doorknob of FIG. 4 in accordance with an embodiment of the present invention.

The illustrations of FIGS. 3 and 4 show an example of a method of use of the shield device 100. Referring specifically to FIG. 3, the shield device 100 may be arranged as shown with the magnets 114 and opening 106 arranged in a generally circular configuration, and with the opening 106 facing a protruding object, such as a doorknob 132, protruding from a surface 136 to be painted. The shield device 100 may be moved 130 over the doorknob 132 or other protruding object, such that the doorknob 132 or other protruding object is received within and covered by the shield body 101. Substantially all, e.g. at least 90 percent of the extent of the protruding object perpendicular to the surface 136 to be painted, may be positioned between the opening 106 and the distal end 104 of the shield device 100.

The magnets 114 may then be engaged with a base of the protruding object, such as within 0 to 3 mm of the surface 136 to be painted. In the illustrated example, this step includes engaging the magnets 114 with a rose 134 of the doorknob 132 such that magnetic forces between the magnets 114 and a ferromagnetic material within the rose 134 secures the shield device 100 over the doorknob 132. In other embodiments, the magnets 114 may be engaged with one another such that magnetic forces between one magnet 114 and another magnet 114 secure the shield device 100 around the protruding object. This would be useful for protruding objects that do not include ferromagnetic material.

Figure 5:
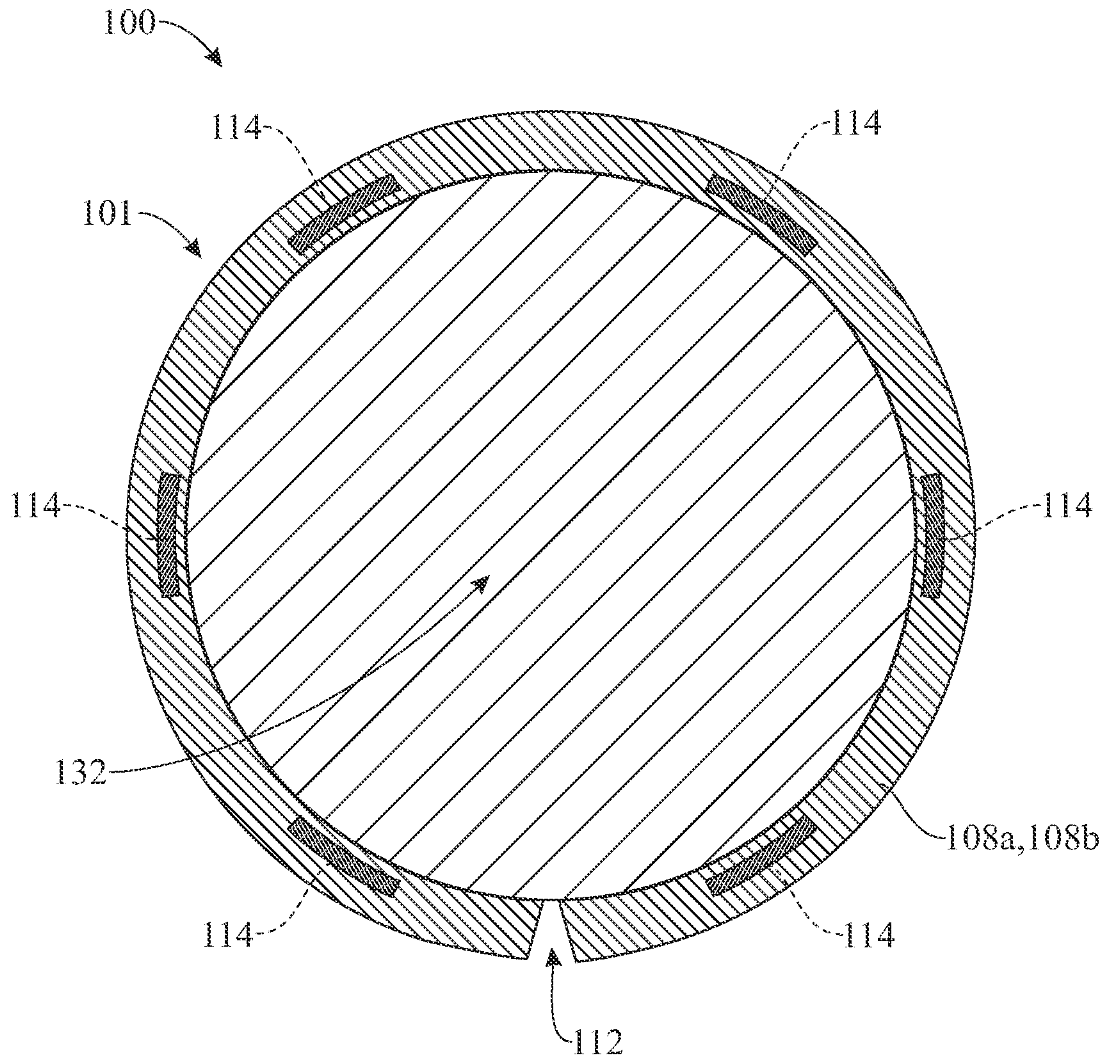
FIG. 5 presents a cross-sectional view of the shield device of FIG. 1 secured over the doorknob, the cross-section taken along section plane 5-5 indicated in FIG. 4.

The illustration of FIG. 5 shows the shield device 100, and particularly, the panels 108*a*, 108*b* and plurality of magnets 114, positioned around the rose 134 of the doorknob 132 of FIGS. 3 and 4. As shown, the panels 108*a*, 108*b* of the shield body 101 are positioned around the rose 134. The magnets 114 are magnetically attracted to the ferromagnetic rose 134 and thereby fasten the panels 108*a*, 108*b* to the rose 134. The opening 106 may be substantially closed, e.g. such that the sides of the slit 112 are within 0 to 3 mm from one another. In the present example, the panels 108, 108*b* and opening 106 are shaped and sized to generally match and conform to the rose 134, such that the panels 108*a*, 108*b* rest on the rose 134 and there are generally no gaps between the panels 108*a*, 108*b* and the rose 134 in the area of the opening 106 and around the perimeter of the opening 106. In some embodiments, the panels 108*a*, 108*b* on either side of the slit 112 may be positioned such that they are overlapping around the base of the protruding object.

Following positioning of the shield device, the surface 136 may be painted and the shield device 100 may be removed from the doorknob 132 or other protruding object, such as while the applied paint is still malleable.

Figure 6:
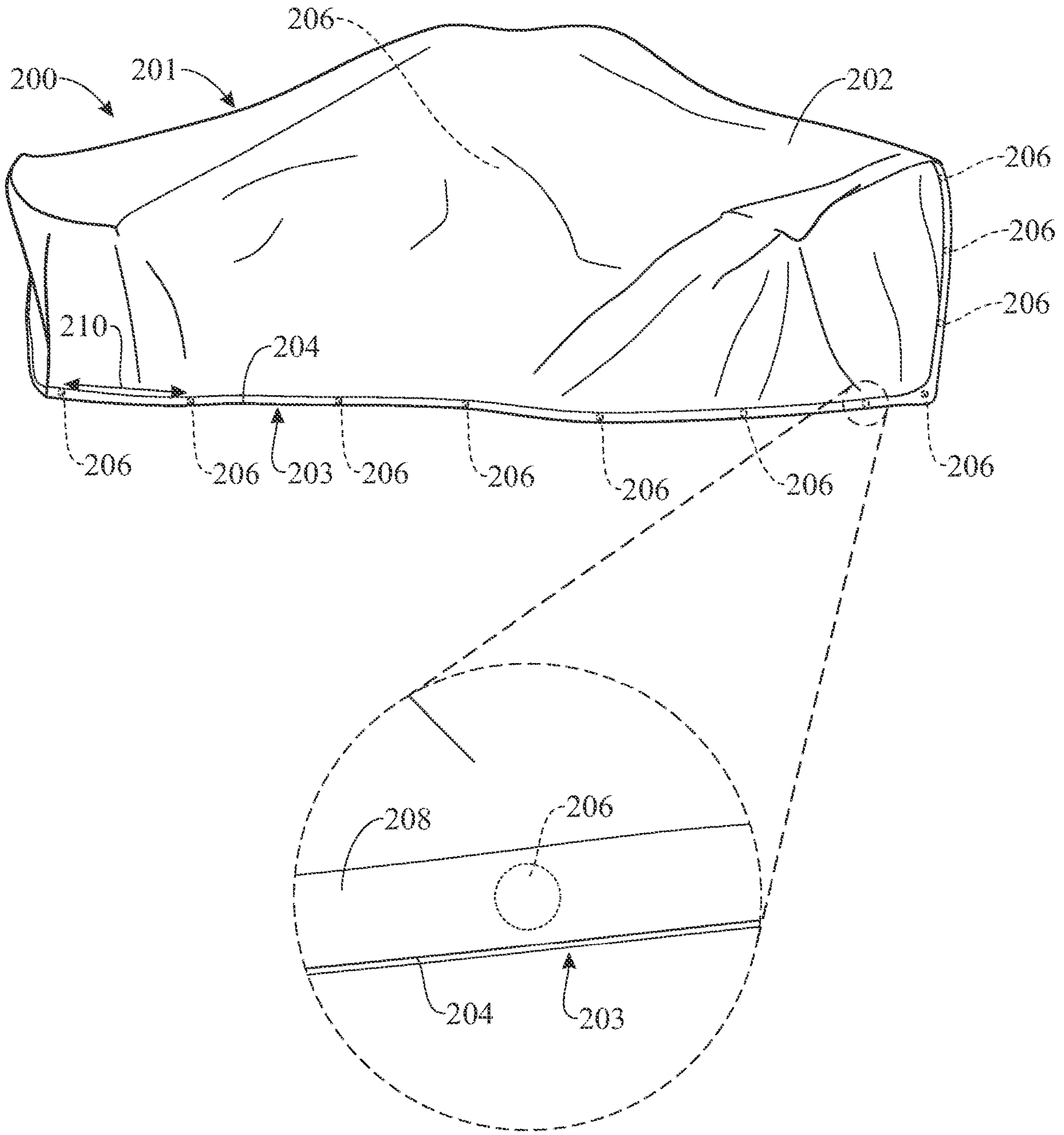
FIG. 6 presents a perspective view of a shield device for covering large and irregularly-shaped objects in accordance with an embodiment of the present invention.

Referring to FIG. 6, various shapes and sizes of a shield device may be used without departing from the scope of the present disclosure. For example, a shield device 200 may include a shield body 201 embodied as a panel 202 of material that is paint impermeable. The panel 202 may be formed as a rectangular or round tarp, bag, or pocket having an opening much larger than its depth, or some other shape. The panel 202 may be a single continuous piece of material or multiple pieces jointed together by seams. The seams may be formed by stitching, adhesive, welds, rivets, or other fastening means. The panel 202 may be made of a paint-impermeable material such as synthetic (nylon, polyester, etc.) or natural (cotton, linen, etc.) fibers. The panel 202 may be a continuous sheet of a polymer such as nylon, polyurethane, polystyrene, cellophane, silicone, natural or synthetic rubber, or other polymer.

At a perimeter 204 of an opening 203 of the shield body 201, the shield body 201 may have a plurality of magnets 206 secured thereto. For example, the magnets 206 may be secured within 1 to 5 mm from the perimeter 204. The magnets 206 are shown as discrete cylindrical magnets. The cylindrical magnets may have a diameter of from 3 to 15 mm and a thickness of from 1 to 5 mm. The cylindrical magnets may be magnetized iron, nickel, cobalt, or rare earth minerals. In some embodiments, a flexible magnetic material in one, two, or other number of pieces. Other shapes and types of magnets may also be used.

In the illustrated embodiment, the magnets 206 are secured to the shield device 100 by folding portions 208 of the panel 202 over the magnets 206 and securing the portions 208 to the panel 202 by means of stitching, adhesives, welding, rivets, or other fastening means. The magnets 206 may be free to slide within the sleeve formed by the folded portions 208 or may be secured within pockets within the sleeve by securing the portions 208 to the panel 202 on either side of each magnet 206. In other embodiments, the magnets 206 are secured to the shield device 200 by bonding the magnets 206 to the panel 202 by means of adhesives either with or without the use of a folded portions 208. Other fastening means may also be used.

In the illustrated embodiment, the magnets 206 are distributed around the opening the perimeter 204 of the panel 202. The illustrated shield 200 may be used for very large objects (e.g., 1 to 3 meters in height, width, and/or depth). The separation 210 between magnets along the perimeter 204 may be correspondingly large, such as from 10 to 50 cm.

In use, the shield device 200 is placed over an object 212 to be covered, such that the object 212 extends through the opening 203 and is received within and covered by the shield body 201 of the shield device 200. To further cover the object 212, portions of the perimeter 204 may be secured to other portions of the perimeter 204 by engaging the magnets 206 in these portions to one another. In this manner, gaps in the shield device 200 that might expose portions of the object 206 may be closed. Following painting, the magnets 206 may be disconnected from one another and the shield device 200 may be removed, such as while the paint applied is still malleable.

The shield device 100, 200 as described herein may be used in a variety of applications. In a first example, the shield device 100, 200 is used to cover various other structures that may be secured to the wall or ceiling of the interior or exterior of a building. For example, a shield device 100 may be used to cover lever doorknobs, brackets for supporting towel rods or curtain rods, sconces, light fixtures, ceiling fans, or any other type of protruding object in a home, office, or other occupied structure. For large irregular structures with a small base relative to the width of the structure outwardly from the base, such as a ceiling fan, the shield device 200 may advantageously be used. In such applications, the magnets 206 may be engaged with one another to close the perimeter 204 of the shield device around the base of the structure. In other embodiments, for large structures with a small base relative to the width of the structure outwardly from the base, the shield device 100 may be used with a slit 112 large enough to enable the shield device to be placed around the structure. In such embodiments, the opening 106 when the sides of the slit 112 are brought together (e.g., from 0 to 1 cm from one another) may be smaller than the diameter of the object that may be placed within the interior space defined by the panels 108*a*, 108*b*. Additional magnets 114 may be placed along the elongated slit 112 in such embodiments to enable the slit 112 to be closed. In either case, the magnets 114 may be used to secure the opening 106 of the shield device 100 around the base of the object as for other applications disclosed herein.

In a second example, a shield device 200 is secured around the sides of an appliance by engaging the magnets 206 to the housing of the appliance. The appliance may be a dishwasher, refrigerator, stove, oven, washing machine, dryer, or the like. The walls around the appliance may then be painted and drips that would be incident on the appliance may be collected by the shield device 200.

In a third example, a portion of an elongate object such as a part of a vehicle or a tool may be covered using the shield device 100, 200. For example, the shield device 100, 200 may be used for covering parts of an automobile, bicycle, machine, or other device during painting or servicing or while surrounding areas are painted. For instance, a handlebar, portion of the frame, cranks, pedals, wheels or other parts of a bicycle may be covered during painting or repair. A portion of a machine may be covered while another part is painted, lubricated, or repaired. A mirror, bumper, fender, window, windshield, or other portion of an automobile may be covered using the shield device 100, 200 during painting or repair.

In a fourth example, the shield device 200 is used to cover the top and underside of an object and/or the top and downwardly extending supports of an object. For example, the shield device 200 may be draped over a piano or table. The magnets 206 may be engaged to one another to secure the shield device 200 around the underside of the object 206. The magnets 206 may additionally or alternatively be secured to one another to wrap the panel 202 around legs or other supports of the object, such as legs of a piano or table. The shield device 200 may also be placed over a bicycle or motorcycle with the magnets 206 engaged with one another under the bicycle or motorcycle.

In a fifth example, the shield device 200 may be used with substantially planar structures, such as windows or countertops such that the object to be shielded is not necessarily positioned within the shield device. For example, the magnets 206 may be engaged with a metallic frame of a window to shield the window and frame from being painted. In another example, the shield device 200 is placed around a sink with the magnets 206 engaging the sink while areas around the sink are painted, caulked, treated with sealant or subject to some other process.

In a sixth example, a shield device 100, 200 may be used to cover an object or portion of an object for a purpose other than painting. The shield device 100, 200 may be made of brightly colored or reflective material or have reflective material secured thereto in order to warn people nearby to avoid contact with the object covered thereby. The shield device 100, 200 may have messages written thereon, such as "POLICE," DO NOT ENTER," or other messages.

In a seventh example, the shield device 100, 200 may be used to prevent spread of disease by instructing people not to touch an object (e.g., "DO NOT TOUCH" printed thereon). A machine that is out of order or being repaired may have one or more controls thereof covered with a shield device 100, 200 with an instruction such as "DO NOT OPERATE." The shield device 100, 200 may be made of material with antimicrobial and/or antiviral properties such that a doorknob or other structure covered thereby may be used with reduced risk of spreading disease.

In an eighth example, the shield device 100, 200 may be used for purely decorative purposes or may have decorative elements incorporated therein though it serves a function according to any of the examples described herein. The shield device 100, 200 may have a decorative design printed thereon and may have raised decorative elements secured thereto, such as flowers, figurines, leaves, holiday-themed objects, or the like.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A shield device comprising:

a paint-impermeable, shield body comprising an interior space, the shield body further comprising an opening providing access to the interior space for insertion and removal of one or more objects into and from the interior space;

at least one magnet arranged along at least part of a perimeter of the opening and adjacent to the opening, the at least one magnet configured to secure the shield body to the one or more objects positioned within the opening;

at least one slit extending into and partially along the shield body from the opening; and one or more magnets extending along the at least one slit, the one or more magnets configured to magnetically attach to one another to close the at least one slit.

2. The shield device of claim 1, wherein access to the interior space of the shield body is provided solely through the opening and the at least one slit.

3. The shield device of claim 1, wherein the at least one magnet comprises a plurality of magnets arranged in discrete positions along the perimeter of the opening.

4. The shield device of claim 3, wherein the plurality of magnets are arranged in spaced-apart relationship with one another.

5. The shield device of claim 3, wherein one or more magnets of the plurality of magnets are configured to magnetically attach to one another to adjust the size of the opening.

6. The shield device of claim 3, wherein the plurality of magnets is configured to attach to a ferromagnetic material of the one or more objects positioned within the opening.

7. The shield device of claim 1, wherein the at least one magnet comprises at least one elongated magnet elongately formed along at least part of the perimeter of the opening.

8. The shield device of claim 1, wherein the shield body is deformable.

9. The shield device of claim 8, wherein the size of the at least one slit is adjustable by deforming the shield body.

10. The shield device of claim 1, wherein the shield body is made of a single panel of paint-impermeable material, the single panel folded onto itself and secured along a seam.

11. The shield device of claim 1, wherein an end portion of the shield body is arranged in a folded-over configuration along the perimeter of the opening and secured in the folded-over configuration defining a sleeve, and further wherein the at least one magnet is positioned inside the sleeve.

12. The shield device of claim 1, wherein the shield body comprises an end portion defining the perimeter of the opening, the end portion sized to conform to the one or more objects positioned within the opening.

13. The shield device of claim 12, wherein the at least one magnet is configured to secure the end portion against the one or more objects positioned within the opening along the perimeter of the opening.

14. A shield device comprising:

a paint-impermeable, shield body comprising an interior space, the shield body further comprising an opening providing access to the interior space for insertion and removal of one or more objects into and from the interior space; and a plurality of magnets arranged in discrete positions along L perimeter of the opening and adjacent to the opening, the plurality of magnets configured to secure the shield body to the one or more objects positioned within the opening, wherein one or more magnets of the plurality of magnets are configured to magnetically attach to one another to adjust a size of the opening.

15. The shield device of claim 14, wherein the plurality of magnets are arranged in spaced-apart relationship with one another.

16. The shield device of claim 14, wherein the plurality of magnets are configured to attach to a ferromagnetic material of the one or more objects positioned within the opening.

* * * * *